(12) United States Patent
Chae et al.

(10) Patent No.: US 12,131,441 B2
(45) Date of Patent: Oct. 29, 2024

(54) LEARNING DEVICE AND METHOD FOR GENERATING IMAGE

(71) Applicant: DEEPBRAIN AI INC., Seoul (KR)

(72) Inventors: Gyeongsu Chae, Seoul (KR); Guembuel Hwang, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 346 days.

(21) Appl. No.: 17/762,820

(22) PCT Filed: Dec. 1, 2020

(86) PCT No.: PCT/KR2020/017408
§ 371 (c)(1),
(2) Date: Mar. 23, 2022

(87) PCT Pub. No.: WO2022/004971
PCT Pub. Date: Jan. 6, 2022

(65) Prior Publication Data
US 2022/0351348 A1    Nov. 3, 2022

(30) Foreign Application Priority Data
Jul. 2, 2020 (KR) .................... 10-2020-0081618

(51) Int. Cl.
*G06T 5/50* (2006.01)
(52) U.S. Cl.
CPC ...... *G06T 5/50* (2013.01); *G06T 2207/20081* (2013.01); *G06T 2207/20084* (2013.01)
(58) Field of Classification Search
CPC ............ G06T 5/50; G06T 2207/20081; G06T 2207/20084; G06T 13/40; G06T 13/80; G06T 13/205; G06N 3/0464
See application file for complete search history.

(56) References Cited

U.S. PATENT DOCUMENTS

| 2007/0052799 A1* | 3/2007 | Chu ..................... G09B 21/009 348/121 |
| 2014/0341442 A1 | 11/2014 | Lewis et al. |
| 2017/0061966 A1* | 3/2017 | Marcheret .............. G06V 20/41 |
| 2018/0349590 A1* | 12/2018 | Huang .............. G06F 18/24143 |

(Continued)

FOREIGN PATENT DOCUMENTS

| JP | 2008-160354 A | 7/2008 |
| KR | 10-0974165 B1 | 8/2010 |

(Continued)

OTHER PUBLICATIONS

Song et al, "Talking Face Generation by Conditional Recurrent Adversarial Network" dated Jul. 25, 2019 (Year: 2019).*

(Continued)

*Primary Examiner* — Ming Y Hon
(74) *Attorney, Agent, or Firm* — The PL Law Group, PLLC

(57) ABSTRACT

A learning device for generating an image according to an embodiment disclosed is a computing device including one or more processors and a memory storing one or more programs executed by the one or more processors. The learning device includes a first machine learning model that generates a mask for masking a portion related to speech in a person basic image with the person basic image as an input, and generates a person background image by synthesizing the person basic image and the mask.

9 Claims, 4 Drawing Sheets

(56) References Cited

U.S. PATENT DOCUMENTS

| | | | |
|---|---|---|---|
| 2020/0051303 A1* | 2/2020 | Li | G06N 3/045 |
| 2021/0035336 A1* | 2/2021 | Lin | G06V 40/171 |
| 2021/0402297 A1* | 12/2021 | Khan | H04N 21/8549 |

FOREIGN PATENT DOCUMENTS

| | | |
|---|---|---|
| KR | 10-2014-0037410 A | 3/2014 |
| KR | 10-2020-0145700 A | 12/2020 |
| KR | 10-2020-0145719 A | 12/2020 |
| WO | WO 2018-225775 A1 | 12/2018 |

OTHER PUBLICATIONS

International Search Report for PCT/KR2020/017408 mailed on Mar. 26, 2021.

\* cited by examiner

LEARNING DEVICE AND METHOD FOR GENERATING IMAGE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/017408, filed Dec. 1, 2020, which claims priority to the benefit of Korean Patent Application No. 10-2020-0081618 filed in the Korean Intellectual Property Office on Jul. 2, 2020, the entire contents of which are incorporated herein by reference.

BACKGROUND

1. Technical Field

Embodiments of the present disclosure relate to a learning technique for generating an image.

2. Background Art

With recent technological development in the artificial intelligence field, various types of contents are being generated based on artificial intelligence technology. For example, there is a case in which, when there is a voice message to be transmitted, a speech moving image is generated as if a famous person (for example, a president) speaks the voice message in order to draw people's attention. This is achieved by generating mouth shapes or the like to fit a specific message, just like a famous person speaking the specific message in an image of the famous person.

For this purpose, in the related art, a method is used in which a landmark or key point related to voice is first generated from an existing speech image, learning about the landmark or key point is performed, and then an image that matches the input voice is synthesized using a trained model. However, in the related art, processes of extracting a key point for learning, transforming the key point into a standard space (a position facing the front from the center of a screen), and performing inverse transformation is inevitably required, and steps of synthesizing a key point and synthesizing an image are necessary, which may lead to a problem of complicating the procedure.

Meanwhile, in the case of the method that does not use the key point, a method in which only the face portion is cut off, alignment is made according to the size and position, and then an image matching the input voice is synthesized is used, which may be unlikely to reflect the natural movement of the person, thereby leading to a problem of unnatural results.

SUMMARY

Disclosed embodiments are to provide a new technique capable of reflecting a motion or gesture occurring during a speech.

In addition, disclosed embodiments are to provide a new technique capable of simplifying the structure of a neural network.

In addition, disclosed embodiments are to provide a new technique capable of accurately masking a part related to a speech.

A learning device for generating an image according to an embodiment is a computing device including one or more processors and a memory storing one or more programs executed by the one or more processors, and the learning device includes a first machine learning model that generates a mask for masking a portion related to speech in a person basic image with the person basic image as an input, and generates a person background image by synthesizing the person basic image and the mask.

The first machine learning model may include a feature extraction unit that extracts a feature tensor from the input person basic image and a mask prediction unit that predicts a mask to be generated in an image space of the person basic image based on the extracted feature tensor.

The mask prediction unit may predict the mask by outputting a probability value of masking of each pixel in the image space through Equation 1 below.

$$p(x_i,y_i)=\mathrm{sigmoid}(f(F(x_i,y_i);\theta_{predictor})) \quad \text{(Equation 1)}$$

$p(x_i, y_i)$: Probability value of masking of pixel $(x_i, y_i)$
$F(x_i, y_i)$: Feature tensor of pixel $(x_i, y_i)$
f: Neural network constituting the mask prediction unit
$\theta_{predictor}$: Parameter of the mask prediction unit The mask prediction unit may predict the mask through Equation 2 and Equation 3 below.

$$\mu_j, \sum\nolimits_j, w_j = f_j(F; \theta_{predictor,j}) \quad \text{(Equation 2)}$$

$$p(X) = \sum_j \frac{w_j}{\sqrt{2\pi}} |\sum\nolimits_j|^{-1/2} \exp\left\{\frac{-1}{2}(X-\mu_j)\sum\nolimits_j^{-1}(X-\mu_j)^T\right\} \quad \text{(Equation 3)}$$

$\mu_j$: Mean of the j-th Gaussian distribution output through the mask prediction unit with the feature tensor F as an input
$\Sigma_j$: Covariance of the j-th Gaussian distribution output through the mask prediction unit with the feature tensor F as an input
$w_j$: Weight for the sum of each Gaussian distribution
X: Position coordinates in image space $(x_i, y_i)$
p(X): Probability value of masking at position X in each image space
T: Transpose matrix The learning device may further include a second machine learning model that reconstructs the person basic image with a speech audio signal related to the person basic image and the person background image generated by the first machine learning model as inputs, and a third machine learning model that reconstructs the person basic image with the person background image generated by the first machine learning model as an input.

The second machine learning model may be trained to reconstruct a portion covered with the mask in the person background image through the speech audio signal.

The first machine learning model may be trained such that an objective function of the second machine learning model and an objective function of the third machine learning model are minimized under a condition that a value of the objective function of the second machine learning model is smaller than a value of the objective function of the third machine learning model.

An objective function $(L_{mask}(\theta))$ of the first machine learning model may be expressed by Equation 4 below.

$$L_{mask}(\theta)=\alpha L_{w\_audio}(\theta)+\beta L_{wo\_audio}(\theta)+\gamma L_{adversarial}(\theta) \quad \text{(Equation 4)}$$

$\theta$: Parameter of the first machine learning model
$\alpha$: Weight of the objective function of the second machine learning model
$\beta$: Weight of the objective function of the third machine learning model γ: Weight of an adversarial objective function $L_{w\_audio}(\theta)$: Objective function of the second machine learning model for training the first machine learning model $L_{wo\_audio}(\theta)$: Objective function of the third machine learning model for training the first machine learning model $L_{adversarial}(\theta)$: Adversarial objective function between the second machine learning model and the third machine learning model for training the first machine learning model The $L_{w\_audio}(\theta)$ may be expressed by Equation 5 below, and the $L_{wo\_audio}(\theta)$ is expressed by Equation 6 below.

$$L_{w\_audio}(\theta) = \|I - G_{w\_audio}(G_{mask}(I;\theta), A; \varphi_1)\| \quad \text{(Equation 5)}$$

$$L_{wo\_audio}(\theta) = \|I - G_{wo\_audio}(G_{mask}(I;\theta); \varphi_2)\| \quad \text{(Equation 6)}$$

I: Person basic image $G_{w\_audio}$: Neural network constituting the second machine learning model $G_{mask}$: Neural network constituting the first machine learning model A: Speech audio signal $\varphi_1$: Parameter of the second machine learning model $G_{wo\_audio}$: Neural network constituting the third machine learning model $\theta_2$: Parameter of the third machine learning model The $L_{adversarial}(\theta)$ may be an objective function that maximizes a difference between the objective function of the second machine learning model and the objective function of the third machine learning model for training the first machine learning model.

A method for generating an image according to an embodiment disclosed herein is a method executed by a computing device including one or more processors and a memory storing one or more programs executed by the one or more processors, and the method includes generating, in a first machine learning model, a mask for masking a portion related to speech in a person basic image with the person basic image as an input, and generating, in the first machine learning model, a person background image by synthesizing the person basic image and the mask.

According to the disclosed embodiments, learning is performed with the person background image including the face and the upper body as an input, in a state in which the portion related to speech is masked, and thus it is possible to generate a speech moving image by reflecting a person's unique gesture or feature appearing during speech of the person, such as the movements of the face, the neck, the shoulder, or the like, thereby making it possible to generate a more natural speech moving image.

In addition, a video part of the speech moving image is input to the first encoder, an audio part thereof is input to the second encoder, and the masked portion related to speech is reconstructed from the audio, and thus it is possible to generate a speech moving image through a single neural network model without a separate key point prediction process.

In addition, a speech moving image is generated that includes not only the face but also the upper body, and thus it is possible to naturally paste the other body parts (for example, torso, arms and legs, or the like) of the person without an additional transformation or synthesis process.

In addition, the first machine learning model is trained by using the second machine learning model that reconstructs the person basic image with the person background image and the speech audio signal as inputs and the third machine learning model that reconstructs the person basic image with only the person background image as an input without the speech audio signal, and thus it is possible to appropriately mask the portion related to speech of the person basic image in the first machine learning model, which makes it possible to generate the person background image.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the following description, the terminology "transmission", "communication", "reception" of a signal or information and terminology similar thereto may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same is true for "reception" of the signal or information. In addition, in the present specification, a meaning in which two or more pieces of data or information are "related" indicates that when any one piece of data (or information) is obtained, at least a portion of other data (or information) may be obtained based thereon.

Further, it will be understood that, although the terms first, second, etc. may be used herein to describe various elements, these elements should not be limited by these terms.

These terms may be used to distinguish one element from another element. For example, without departing from the scope of the present disclosure, a first element could be termed a second element, and similarly, a second element could be termed a first element.

Figure 1:
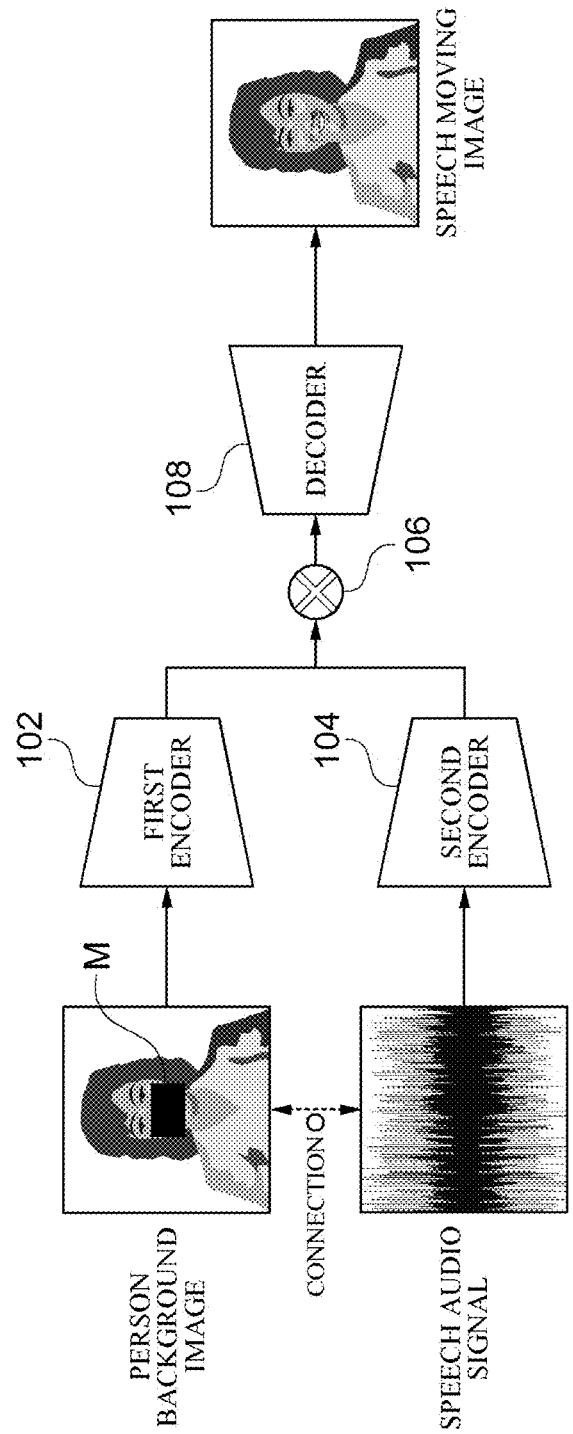
FIG. 1 is a block diagram showing a configuration of a device for generating a speech moving image according to an embodiment of the present disclosure.

FIG. 1 is a block diagram showing a configuration of a device for generating a speech moving image according to an embodiment of the present disclosure. Referring to FIG. 1, the device for generating a speech moving image (speech moving image generation device) 100 may include a first encoder 102, a second encoder 104, a combination unit 106, and a decoder 108.

The components of the speech moving image generation device 100 shown in FIG. 1 represents functionally distinct functional elements, and may be functionally connected to each other in order to perform a function according to the present disclosure, and any one or more components may actually be implemented as being physically integrated with each other.

In an exemplary embodiment, the speech moving image generation device 100 may be built with a machine learning technology based on a convolutional neural network (CNN); however, the machine learning technology is not limited thereto, and various other machine learning techniques may be applied. Hereinafter, a learning process for generating a speech moving image will be mainly described.

The first encoder 102 may be a machine learning model that is trained to extract image feature vectors with a person background image as an input. Hereinafter, "vector" may be used to include "tensor".

Here, the person background image input to the first encoder 102 is an image in which the person is speaking (uttering). The person background image may be an image including the face and upper body of a person. That is, the person background image may be an image including not only the face but also the upper body so that movements of the face, neck, shoulders, or the like, appearing when the person is speaking are shown. However, the person background image is not limited thereto, and may be an image including the face of the person.

In the person background image input to the first encoder 102, a portion related to speech may be masked. That is, the portion related to speech (e.g., a mouth and a portion around the mouth) in the person background image may be covered with a mask M. In addition, during the masking process, portions related to a face movement, a neck movement, a shoulder movement, or the like, accompanied by the speech of the person may not be masked in the person background image. Then, the first encoder 102 extracts an image feature vector of a portion excluding the portion related to speech from the person background image.

The first encoder 102 may include one or more convolutional layers and one or more pooling layers. The convolution layer may extract feature values of pixels corresponding to a filter having a preset size (e.g., pixel size of 3×3) while moving the filter from the input person background image at regular intervals. The pooling layer may perform down sampling by receiving the output of the convolution layer as an input.

The second encoder 104 is a machine learning model trained to extract a voice feature vector with a speech audio signal as an input. Here, the speech audio signal may correspond to an audio part of a person background image (that is, an image in which a person is speaking) input to the first encoder 102. In other words, in a moving image in which a person is speaking, a video part may be input to the first encoder 102, and an audio part may be input to the second encoder 104. The second encoder 104 may include one or more convolutional layers and one or more pooling layers; however, the structure of the neural network of the second encoder 104 is not limited thereto.

The time of the person background image input to the first encoder 102 and the time of the speech audio signal input to the second encoder 104 may be synchronized with each other. That is, in the moving image in which a person is speaking, a video may be input to the first encoder 102 and an audio may be input to the second encoder 104 in an interval of the same time slot. In this case, the person background image and the speech audio signal may be input to the first encoder 102 and the second encoder 104 every preset unit time (e.g., one frame or a plurality of consecutive frames, or the like).

The combination unit 106 may generate a combination vector by combining the image feature vector output from the first encoder 102 and the voice feature vector output from the second encoder 104. In an exemplary embodiment, the combination unit 106 may generate a combination vector by concatenating the image feature vector and the voice feature vector, but is not limited thereto.

The decoder 108 may reconstruct a speech moving image of the person with the combination vector output from the combination unit 106 as an input. Specifically, the decoder 108 may be a machine learning model trained to reconstruct a portion (that is, portion related to the speech) covered with the mask M of the image feature vector (that is, a video part in the moving image in which the person is speaking, which indicates the feature of the portion related to speech covered with the mask) output from the first encoder 102 based on the voice feature vector (that is, the feature of the audio part of the moving image in which the person is speaking) output from the second encoder 104. That is, the decoder 108 may be a model trained to reconstruct a masked region using the audio signal when a portion related to speech is masked in the person background image.

In an exemplary embodiment, the decoder 108 may generate a speech moving image by performing inverse convolution on a combination vector in which the image feature vector output from the first encoder 102 and the voice feature vector output from the second encoder 104 are combined, and then performing up-sampling.

The decoder 108 may compare the generated speech moving image with the original speech moving image (that is, the correct value), and adjust learning parameters (for example, a loss function, softmax function, or the like) such that the generated speech moving image (that is, the moving image in which the portion related to speech is reconstructed through the audio part) is close to the original speech moving image.

Figure 2:
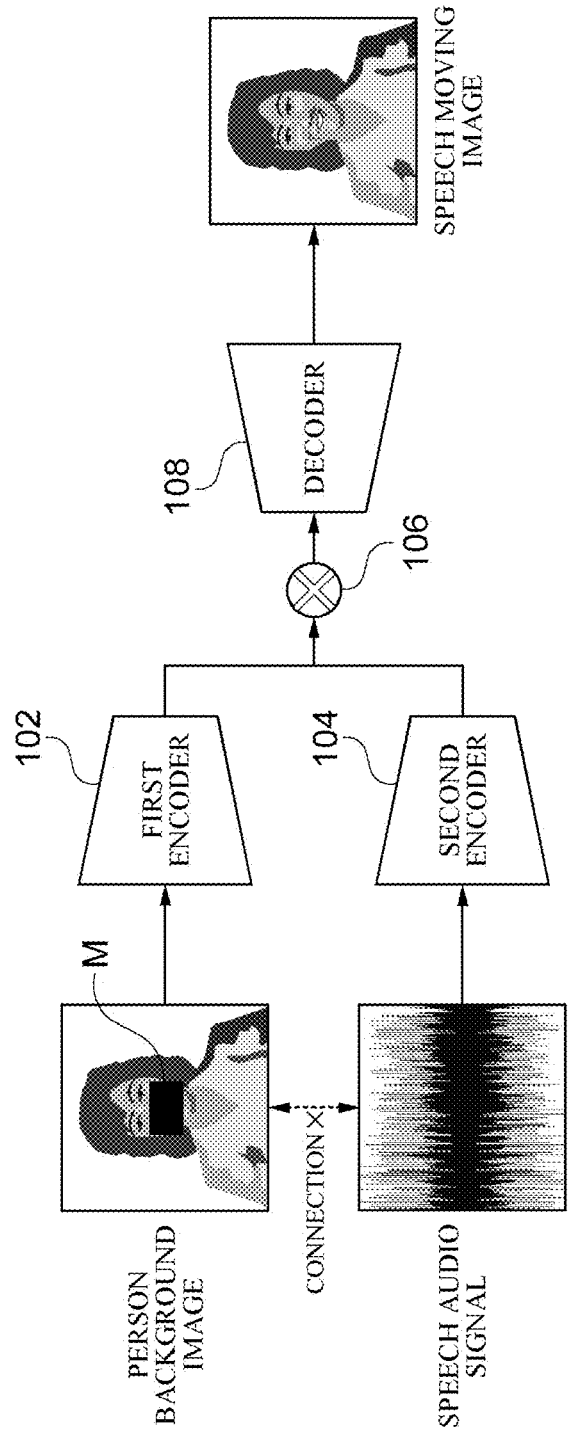
FIG. 2 is a view showing a state in which a speech moving image is inferred through the device for generating a speech moving image according to an embodiment of the present disclosure.

FIG. 2 is a view showing a state in which a speech moving image is inferred through the speech moving image generation device according to an embodiment of the present disclosure.

Referring to FIG. 2, the first encoder 102 receives a person background image. Here, the person background image may be a person background image used in a learning process. The person background image may be an image including the face and upper body of a person. In addition, in the person background image, a portion related to speech may be covered with the mask M. The first encoder 102 may extract an image feature vector from the person background image.

The second encoder 104 receives a speech audio signal. Here, the speech audio signal may be unrelated to the person background image input to the first encoder 102.

For example, the speech audio signal may be a speech audio signal of a person different from the person in the person background image. However, the speech audio signal is not limited thereto, and may be spoken by a person in the person background image. In this case, the speech of the person may be given in a background or situation unrelated to the person background image. The second encoder 104 may extract a voice feature vector from the speech audio signal.

The combination unit 106 may generate a combination vector by combining the image feature vector output from the first encoder 102 and the voice feature vector output from the second encoder 104.

The decoder 108 may reconstruct and output the speech moving image with the combination vector as an input. That is, the decoder 108 may generate the speech moving image by reconstructing the portion related to speech of the person background image based on the voice feature vector output from the second encoder 104. In this case, the speech audio signal input to the second encoder 104 is a speech that is unrelated to the person background image (for example, it is not the speech of the person in the person background image), but the speech moving image is generated as if the person in the person background image is speaking.

According to the disclosed embodiments, learning is performed with the person background image including the face and the upper body as an input, in a state in which the portion related to speech is masked, and thus it is possible to generate a speech moving image by reflecting a person's unique gesture or feature appearing during speech of the person, such as the movements of the face, the neck, the shoulder, or the like, thereby making it possible to generate a more natural speech moving image.

In addition, the video part of the speech moving image is input to the first encoder 102, the audio part thereof is input to the second encoder 104, and the masked portion related to speech is reconstructed from the audio, and thus it is possible to generate a speech moving image through a single neural network model without a separate key point prediction process.

In addition, a speech moving image is generated that includes not only the face but also the upper body, and thus it is possible to naturally paste the other body parts (for example, torso, arms and legs, or the like) of the person without an additional transformation or synthesis process.

Meanwhile, when the mask M does not properly cover the portion related to speech in the person background image, there is a risk that learning will be performed such that a portion unrelated to speech controls the mask part in the machine learning model. On the other hand, when the mask M in the person background image covers the portion related to speech more than necessary, it is likely that the speech moving image is unnaturally generated. Accordingly, it is necessary for the mask M to properly cover only the portion related to speech of the person in the person background image.

Figure 3:
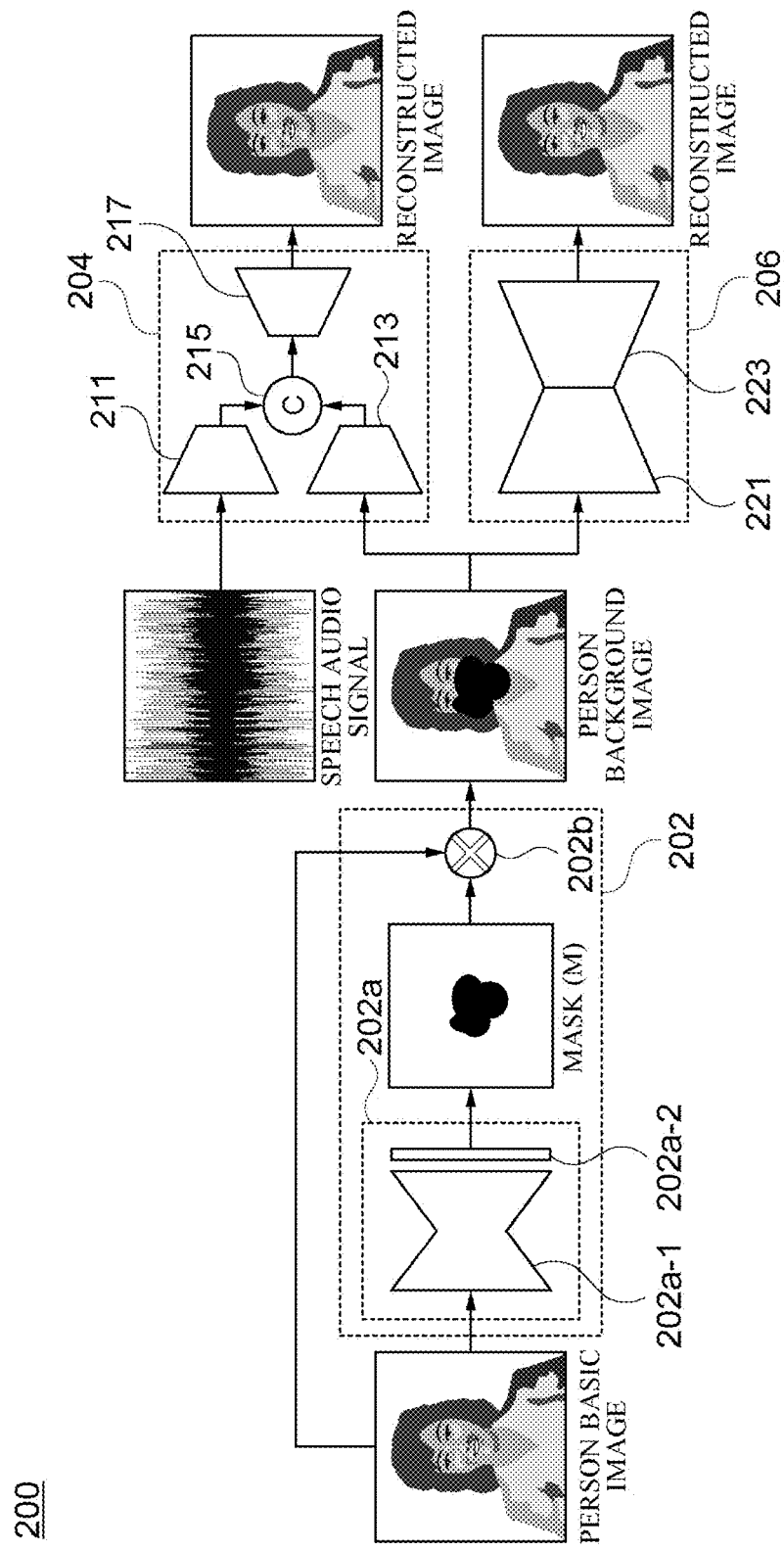
FIG. 3 is a block diagram showing a configuration of a device for generating a speech moving image according to another embodiment of the present disclosure.

FIG. 3 is a block diagram showing a configuration of a device for generating a speech moving image according to another embodiment of the present disclosure.

Referring to FIG. 3, a speech moving image generation device 200 may include a first machine learning model 202, a second machine learning model 204, and a third machine learning model 206. The first machine learning model 202, the second machine learning model 204, and the third machine learning model 206 may form one neural network model through which they are interconnected. That is, the first machine learning model 202, the second machine learning model 204, and the third machine learning model 206 may be organically connected and simultaneously trained.

The first machine learning model 202 may be a machine learning model trained to generate a person background image with a person basic image as an input. Here, the person basic image may be an image in which the person is speaking. The person basic image is an image including a face of the person, and may include the face and upper body of the person, but is not limited thereto. In addition, the person background image may be an image in which a portion related to speech is covered with the mask M in the person basic image. That is, when the person basic image is input, the first machine learning model 202 may be trained to generate a person background image in which the portion related to speech is covered with the mask M in the person basic image.

The first machine learning model 202 may include a mask generation unit 202a and an image synthesis unit 202b. The mask generation unit 202a may be trained to generate the mask M with the person basic image as an input. That is, when the person basic image is input, the mask generation unit 202a may be trained to predict information on an area related to speech (that is, an area to be covered with the mask M) in the person basic image.

In an exemplary embodiment, the mask generation unit 202a may include a feature extraction unit 202a-1 and a mask prediction unit 202a-2. The feature extraction unit 202a-1 may extract a feature tensor from the input person basic image. The mask prediction unit 202a-2 may predict the shape, size, position, and the like of the mask M based on the extracted feature tensor.

In an exemplary embodiment, the mask prediction unit 202a-2 may predict the mask M by outputting a probability of each pixel being a position to be masked in the image space based on the extracted feature tensor. This may be expressed by Equation 1 below.

$$p(x_i, y_i) = \text{sigmoid}(f(F(x_i, y_i); \theta_{predictor})) \quad \text{(Equation 1)}$$

where $p(x_i, y_i)$ denotes a probability value of masking of pixel $(x_i, y_i)$, $F(x_i, y_i)$ denotes a feature tensor of pixel $(x_i, y_i)$, f denotes a neural network constituting the mask prediction unit 202a-2, and $\theta_{predictor}$ denotes a parameter of the neural network f.

In another embodiment, the mask prediction unit 202a-2 may predict the mask M through a probability distribution model using a Gaussian function, which may be expressed by Equations 2 and 3 below $$\mu_j, \sum\nolimits_j, w_j = f_j(F; \theta_{predictor, j}) \quad \text{(Equation 2)}$$

$$p(X) = \sum_j \frac{w_j}{\sqrt{2\pi}} |\sum\nolimits_j|^{-1/2} \exp\left\{\frac{-1}{2}(X - \mu_j)\sum\nolimits_j^{-1}(X - \mu_j)^T\right\} \quad \text{(Equation 3)}$$

Here, $\mu_j$ denotes the mean of the j-th Gaussian distribution output through the mask prediction unit 202a-2 with the feature tensor F as an input, $\Sigma_j$ denotes the covariance of the j-th Gaussian distribution output through the mask prediction unit with the feature tensor F as an input, and $w_j$ denotes a weight for the sum of each Gaussian distribution.

In addition, $X=(x_i, y_i)$ denotes the position coordinate in the image space, $p(X)$ denotes a value between 0 and 1 as a probability value for masking at position X in each image space, and T denotes the transpose matrix.

The image synthesis unit 202b may generate the person background image by synthesizing the person basic image and the mask M generated by the mask generation unit 202a. That is, the image synthesis unit 202b may generate the person background image in which the portion related to speech is covered with the mask M in the person basic image.

Generation of the person background image by the first machine learning model 202 with the person basic image as an input may be expressed by Equation 4 below.

$$B = G_{mask}(I; \theta) \quad \text{(Equation 4)}$$

Here, B denotes the person background image, $G_{mask}$ denotes a neural network constituting the first machine learning model 202, I denotes the person basic image, and $\theta$ denotes a parameter of the neural network $G_{mask}$.

The second machine learning model 204 may be a machine learning model trained to reconstruct the person basic image (that is, image input to the first machine learning model 202) with the speech audio signal and the person background image generated by the first machine learning model 202 as inputs.

Here, the speech audio signal may correspond to an audio part of the person basic image (that is, an image in which a person is speaking) input to the first machine learning model 202. The times of the person basic image and the speech audio signal may be synchronized with each other.

The second machine learning model 204 may be trained to reconstruct the portion related to speech in the person background image (that is, the image in which the portion related to speech is covered with the mask M in the person basic image) through the speech audio signal.

Figure 4:
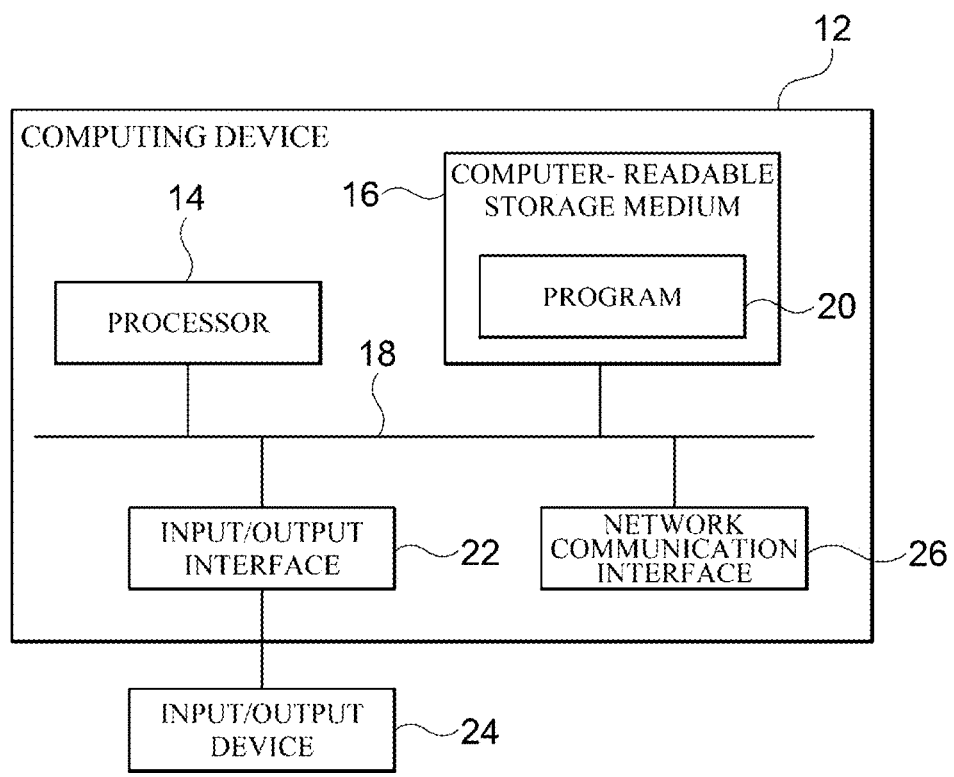
FIG. 4 is a block diagram exemplarily illustrating a computing environment that includes a computing device suitable for use in exemplary embodiments.

In an exemplary embodiment, the second machine learning model 204 may have the same or similar neural network structure as or to that of FIG. 1. That is, as shown in FIG. 4, the second machine learning model 204 may include a first encoder 211, a second encoder 213, a combination unit 215, and a decoder 217.

The first encoder 211 may extract an image feature vector with the person background image generated by the first machine learning model 202 as an input. The second encoder 213 may extract a voice feature vector with the speech audio signal as an input. The combination unit 215 may generate a combination vector by combining the image feature vector output from the first encoder 211 and the voice feature vector output from the second encoder 213. The decoder 217 may reconstruct the person basic image with the combination vector output from the combination unit 215 as an input.

Reconstruction of the person basic image by the second machine learning model 204 with the person background image and speech audio signal as inputs may be expressed by Equation 5 below.

$$I' = G_{w\_audio}(B, A; \phi_1) \quad \text{(Equation 5)}$$

Here, I' denotes an image reconstructed by the second machine learning model 204, $G_{w\_audio}$ denotes a neural network constituting the second machine learning model 204, B denotes the person background image, and A denotes the speech audio signal, and $\phi_1$ denotes a parameter of the neural network $G_{w\_audio}$.

The second machine learning model 204 may be trained to minimize the difference between the person basic image and the image reconstructed with the person background image and the speech audio signal as inputs. In this case, an objective function $L_{w\_audio}(\phi_1)$ of the second machine learning model 204 may be expressed by Equation 6 below.

$$L_{w\_audio}(\phi_1) = \|I - G_{w\_audio}(B, A; \phi_2)\| \quad \text{(Equation 6)}$$

In addition, the optimized parameter $\phi^*_1$ of the second machine learning model 204 may be expressed by Equation 7 below.

$$\phi^*_1 = \operatorname{argmin}_{\phi_1}(L_{w\_audio}(\phi_1)) \quad \text{(Equation 7)}$$

Here, $\operatorname{argmin}_{\phi_1}(\ )$ denotes a function to find $\phi_1$ minimizing ( ).

The third machine learning model 206 may be a machine learning model trained to reconstruct the person basic image (that is, image input to the first machine learning model 202) with the person background image generated by the first machine learning model 202 as an input.

That is, the second machine learning model 204 reconstructs the person basic image based on the person background image and the speech audio signal, whereas the third machine learning model 206 reconstructs the person basic image by using only the person background image without the speech audio signal.

In an exemplary embodiment, the third machine learning model 206 may include an encoder 221 that extracts an image feature vector from the person background image and a decoder 223 that reconstructs the person basic image with the extracted image feature vector as an input.

Reconstruction of the person background image by the third machine learning model 206 with the person background image as an input may be expressed by Equation 8 below.

$$I' = G_{wo\_audio}(B, ; \phi_2) \quad \text{(Equation 8)}$$

Here, $G_{wo\_audio}$ denotes a neural network constituting the third machine learning model 206, and $\phi_2$ denotes a parameter of the neural network $G_{wo\_audio}$.

The third machine learning model 206 may be trained to minimize the difference between the person basic image and the image reconstructed with the person background image as an input. In this case, an objective function $L_{w\_audio}(\phi_2)$ of the third machine learning model 206 may be expressed by Equation 9 below.

$$L_{wo\_audio}(\phi_2) = \|I - G_{wo\_audio}(B; \phi_2)\| \quad \text{(Equation 9)}$$

In addition, the optimized parameter $\phi^*_2$ of the third machine learning model 206 may be expressed by Equation 10 below.

$$\phi^*_2 = \operatorname{argmin}_{\phi_2}(L_{wo\_audio}(\phi_2)) \quad \text{(Equation 10)}$$

Meanwhile, when the mask M is generated so that the portion related to speech is well covered when the first machine learning model 202 generates the person background image, the person basic image reconstructed by the second machine learning model 204 has a high similarity to the original person basic image (that is, the person basic image input to the first machine learning model 202), and the person basic image reconstructed by the third machine learning model 206 has a low similarity to the original person basic image.

That is, at the time of generating the person background image by the first machine learning model 202, when the mask M is generated so that the portion related to speech is well covered, the second machine learning model 204 with the speech audio signal together with the person background image as inputs reconstructs the person basic image well, whereas the third machine learning model 206 with only the person background image as an input without the speech audio signal does not reconstruct the person basic image well.

Further, at the time of generating the person background image by the first machine learning model 202, when the mask M is generated so that the portion related to speech is not well covered, the second machine learning model 204 with the speech audio signal together with the person background image as inputs does not reconstruct the person basic image well, whereas the third machine learning model 206 with only the person background image as an input without the speech audio signal reconstructs the person basic image well.

Therefore, when the first machine learning model 202 is trained such that the second machine learning model 204 with the speech audio signal as an input together with the person background image reconstructs the person basic image better than the third machine learning model 206 with only the person background image as an input without the speech audio signal, the mask M may be generated such that the portion related to speech of the person is well covered in the person background image generated by the first machine learning model 202.

Hereinafter, the training of the first machine learning model 202 in correlation with the second machine learning model 204 and the third machine learning model 206 will be described in detail. The first machine learning model 202 may be trained such that the objective function $L_{w\_audio}$ of the second machine learning model 204 and the objective function $L_{wo\_audio}$ of the third machine learning model 206 are minimized under the condition that the value of the objective function $L_{w\_audio}$ of the second machine learning model 204 is smaller than the value of the objective function $L_{wo\_audio}$ of the third machine learning model 206.

Accordingly, an objective function $L_{mask}(\theta))$ of the first machine learning model 202 and an optimized parameter $\theta^*$ of the first machine learning model 202 may be expressed by Equations 11 and 12 below.

$$L_{mask}(\theta) = \alpha L_{w\_audio}(\theta) + \beta L_{wo\_audio}(\theta) + \gamma L_{adversarial}(\theta) \quad \text{(Equation 11)}$$

$$\theta^* = \mathrm{argmin}_\theta(L_{mask}(\theta)) \quad \text{(Equation 12)}$$

α: Weight of the objective function of the second machine learning model

β: Weight of the objective function of the third machine learning model

γ: Weight of an adversarial objective function $L_{w\_audio}(\theta)$: Objective function of the second machine learning model for training the first machine learning model $L_{wo\_audio}(\theta)$: Objective function of the third machine learning model for training the first machine learning model $L_{adversarial}(\theta)$: Adversarial objective function between the second machine learning model and the third machine learning model for training the first machine learning model.

In more detail, $L_{adversarial}(\theta)$ may mean an objective function (hereinafter, referred to as an adversarial objective function) that maximizes a difference between the objectives function of the second machine learning model the third machine learning model for training the first machine learning model.

Further, α, β, and γ may be values between 0 and 1, respectively, and α+β+γ may be equal to 1.

In addition, $L_{w\_audio}(\theta)$ and $L_{wo\_audio}(\theta)$ are respectively as follows.

$$L_{w\_audio}(\theta) = \|I - G_{w\_audio}(G_{mask}(I;\theta), A; \varphi_1)\|$$

$$L_{wo\_audio}(\theta) = \|I - G_{wo\_audio}(G_{mask}(I;\theta); \varphi_2)\|$$

In addition, the adversarial objective function can be expressed as $L_{adversarial}(\theta) = L_{w\_audio}(\theta) - L_{wo\_audio}(\theta)$ and can also be expressed as $$L_{adversarial}(\theta) = \frac{L_{w\_audio}(\theta)}{L_{wo\_audio}(\theta)}.$$

As described above, the first machine learning model 202 is trained by using the second machine learning model 204 that reconstructs the person basic image with the person background image and the speech audio signal as inputs and the third machine learning model 206 that reconstructs the person basic image with only the person background image as an input without the speech audio signal, and thus it is possible to appropriately mask the portion related to speech of the person basic image in the first machine learning model 202, which makes it possible to generate the person background image.

FIG. 4 is a block diagram exemplarily illustrating a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the speech moving image generation device 100 or 200.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card.

The exemplary input/output device 24 may be included inside the computing device 12 as a component constituting the computing device 12, or may be connected to the computing device 12 as a separate device distinct from the computing device 12.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A learning device for generating an image, the learning device being a computing device including:
    one or more processors;
    a memory storing one or more programs executed by the one or more processors; and
    a first machine learning model that is executed by the one or more processors, generates a mask for masking a portion related to speech in a person basic image with the person basic image as an input, and generates a person background image by synthesizing the person basic image and the mask,
    wherein the first machine learning model includes:
    a feature extraction unit that extracts a feature tensor from the input person basic image; and
    a mask prediction unit that predicts a mask to be generated in an image space of the person basic image based on the extracted feature tensor,
    wherein the mask prediction unit predicts the mask by outputting a probability value of masking of each pixel in the image space through Equation 1 below:

$$p(x_i, y_i) = \text{sigmoid}(f(F(x_i, y_i); \theta_{predictor})) \quad \text{[Equation 1]}$$

p $(x_i, y_i)$: Probability value of masking of pixel $(x_i, y_i)$
F $(x_i, y_i)$: Feature tensor of pixel $(x_i, y_i)$
f: Neural network constituting the mask prediction unit
$\theta_{predictor}$: Parameter of the mask prediction unit.

2. The learning device of claim 1, further comprising:
    a second machine learning model that reconstructs the person basic image with a speech audio signal related to the person basic image and the person background image generated by the first machine learning model as inputs; and
    a third machine learning model that reconstructs the person basic image with the person background image generated by the first machine learning model as an input.

3. The learning device of claim 2, wherein the second machine learning model is trained to reconstruct a portion covered with the mask in the person background image through the speech audio signal.

4. The learning device of claim 2, wherein the first machine learning model is trained such that an objective function of the second machine learning model and an objective function of the third machine learning model are minimized under a condition that a value of the objective function of the second machine learning model is smaller than a value of the objective function of the third machine learning model.

5. The learning device of claim 4, wherein an objective function ($L_{mask}(\theta)$) of the first machine learning model is expressed by Equation 4 below;

$$L_{mask}(\theta) = \alpha L_{w\_audio}(\theta) + \beta L_{wo\_audio}(\theta) + \gamma L_{adversarial}(\theta) \quad \text{(Equation 4)}$$

θ: Parameter of the first machine learning model
α: Weight of the objective function of the second machine learning model
β: Weight of the objective function of the third machine learning model
γ: Weight of an adversarial objective function
$L_{w\_audio}(\theta)$: Objective function of the second machine learning model for training the first machine learning model
$L_{wo\_audio}(\theta)$: Objective function of the third machine learning model for training the first machine learning model
$L_{adversaial}(\theta)$: Adversarial objective function between the second machine learning model and the third machine learning model for training the first machine learning model.

6. The learning device of claim 5, wherein the $L_{w\_audio}(\theta)$ is expressed by Equation 5 below, and the $L_{wo\_audio}(\theta)$ is expressed by Equation 6 below [.]:

$$L_{w\_audio}(\theta) = \|I - G_{w\_audio}(G_{mask}(I;\theta), A; \varphi_1)\| \quad \text{(Equation 5)}$$

$$L_{wo\_audio}(\theta) = \|I - G_{wo\_audio}(G_{mask}(I;\theta); \varphi_2)\| \quad \text{(Equation 6)}$$

I: Person basic image
$G_{w\_audio}$: Neural network constituting the second machine learning model
$G_{mask}$: Neural network constituting the first machine learning model
A: Speech audio signal
$\varphi_1$: Parameter of the second machine learning model
$G_{wo\_audio}$: Neural network constituting the third machine learning model
$\phi_2$: Parameter of the third machine learning model.

7. The learning device of claim 6, wherein the $L_{adversarial}(\theta)$ is an objective function that maximizes a difference between the objective function of the second machine learning model and the objective function of the third machine learning model for training the first machine learning model.

8. A learning device for generating an image that is a computing device including:
    one or more processors; and
    a memory storing one or more programs executed by the one or more processors, the learning device comprising:
    a first machine learning model that generates a mask for masking a portion related to speech in a person basic image with the person basic image as an input, and generates a person background image by synthesizing the person basic image and the mask,
    wherein the first machine learning model includes:
    a feature extraction unit that extracts a feature tensor from the input person basic image; and
    a mask prediction unit that predicts a mask to be generated in an image space of the person basic image based on the extracted feature tensor, wherein the mask prediction unit predicts the mask through Equation 2 and Equation 3 below:

$$\mu_j, \Sigma_j, w_j = f_j(F; \theta_{predictor,j}) \quad \text{(Equation 2)}$$

$$p(X) = \sum_j \frac{w_j}{\sqrt{2\pi}} |\Sigma_j|^{-1/2} \exp\left\{\frac{-1}{2}(X-\mu_j)\Sigma_j^{-1}(X-\mu_j)^T\right\} \quad \text{(Equation 3)}$$

$\mu_j$: Mean of the j-th Gaussian distribution output through the mask prediction unit with the feature tensor F as an input $\Sigma_j$: Covariance of the j-th Gaussian distribution output through the mask prediction unit with the feature tensor F as an input $w_j$: Weight for the sum of each Gaussian distribution X: Position coordinates in image space $(x_i, y_i)$ p (X): Probability value of masking at position X in each image space T: Transpose matrix.

9. A method for generating an image that is executed by a computing device comprising one or more processors and a memory storing one or more programs executed by the one or more processors, the method comprising:

generating, in a first machine learning model, a mask for masking a portion related to speech in a person basic image with the person basic image as an input; and generating, in the first machine learning model, a person background image by synthesizing the person basic image and the mask-, wherein the generating method, in the first machine learning model includes:

extracting, a feature extraction unit, a feature tensor from the input person basic image; and predicting, a mask prediction unit, a mask to be generated in an image space of the person basic image based on the extracted feature tensor, wherein the predicting method, in the mask prediction unit, the mask by outputting a probability value of masking of each pixel in the image space through Equation 1 below:

$$p(x_i,y_i) = \text{sigmoid}(f(F(x_i,y_i);\theta_{predictor})) \quad \text{(Equation 1)}$$

p $(x_i, y_i)$: Probability value of masking of pixel $(x_i, y_i)$

F $(x_i, y_i)$: Feature tensor of pixel $(x_i, y_i)$ f: Neural network constituting the mask prediction unit $\theta_{predictor}$: Parameter of the mask prediction unit.

\* \* \* \* \*